United States Patent [19]

Cherry et al.

[11] 4,252,992
[45] Feb. 24, 1981

[54] INTERNALLY FIRED SPLICING DEVICE

[75] Inventors: Hitesh Cherry, Harrisburg; Walter M. Werner, Downingtown, both of Pa.

[73] Assignee: AMP Incorporated, Harrisburg, Pa.

[21] Appl. No.: 40,827

[22] Filed: May 21, 1979

[51] Int. Cl.³ .............................. H02G 15/08
[52] U.S. Cl. .................. 174/90; 174/84 R; 174/94 R
[58] Field of Search ............ 174/84 R, 84 C, 90, 174/94 R, 87; 339/276 E, 273 R

[56] References Cited

U.S. PATENT DOCUMENTS

| | | | |
|---|---|---|---|
| 3,345,454 | 10/1967 | Mixon, Jr. | 174/90 X |
| 3,515,794 | 6/1970 | Beinhaur et al. | 174/90 |
| 3,681,512 | 1/1972 | Werner | 174/84 R |
| 3,761,602 | 9/1973 | De Sio et al. | 174/90 X |
| 3,826,860 | 7/1974 | De Sio et al. | 174/84 R X |

*Primary Examiner*—Roy N. Envall, Jr.
*Attorney, Agent, or Firm*—Allan B. Osborne

[57] ABSTRACT

This invention relates to a device for splicing the ends of two large diameter cable of the type having an inner core of steel wires around which aluminum wires are helically wrapped. The device includes outer and inner housings. A firing barrel and associated pistons are positioned within the inner housing along with a first set of cable gripping jaws. A second set of cable gripping jaws are positioned within the first housing and are in tandem with the first set of jaws.

1 Claim, 4 Drawing Figures

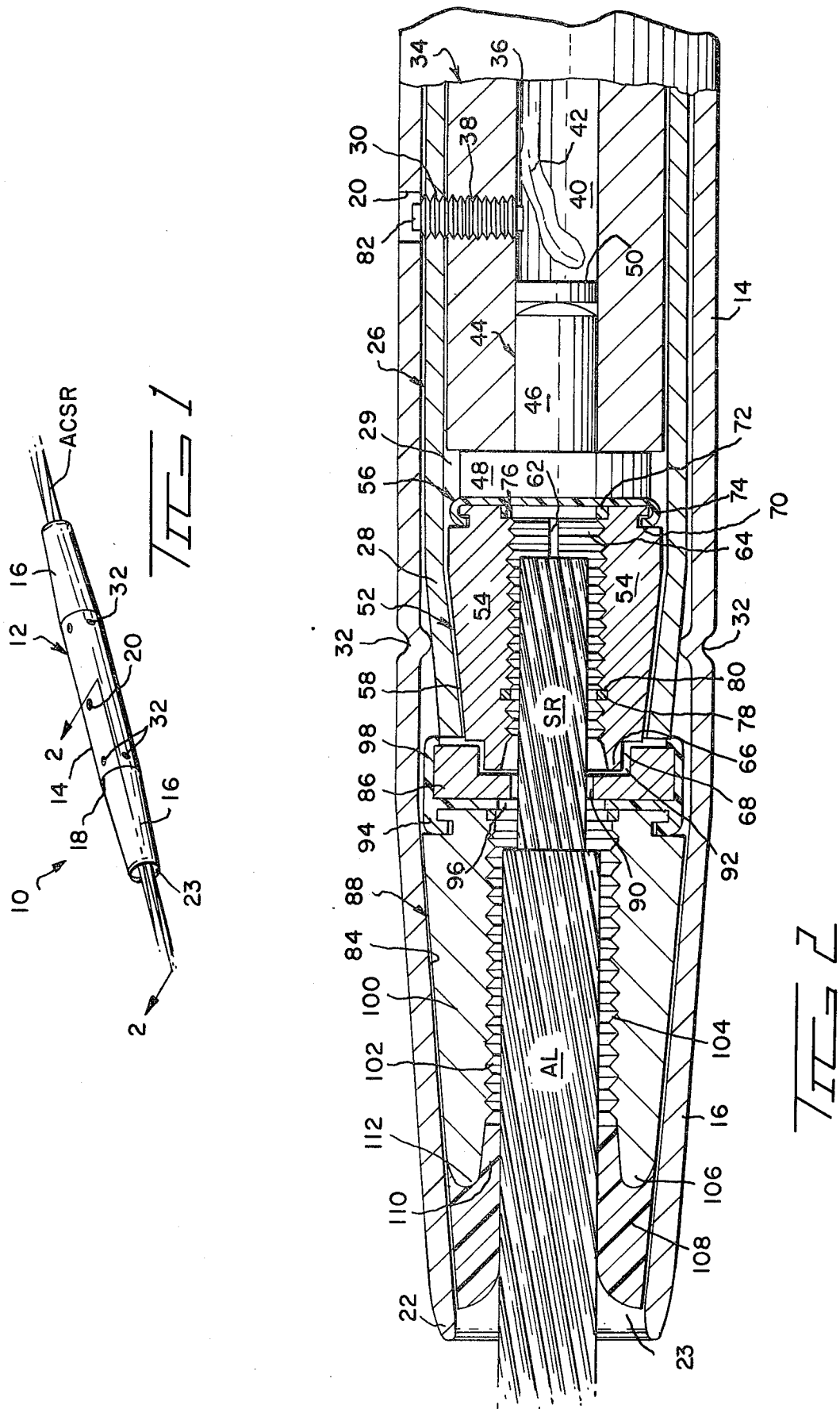

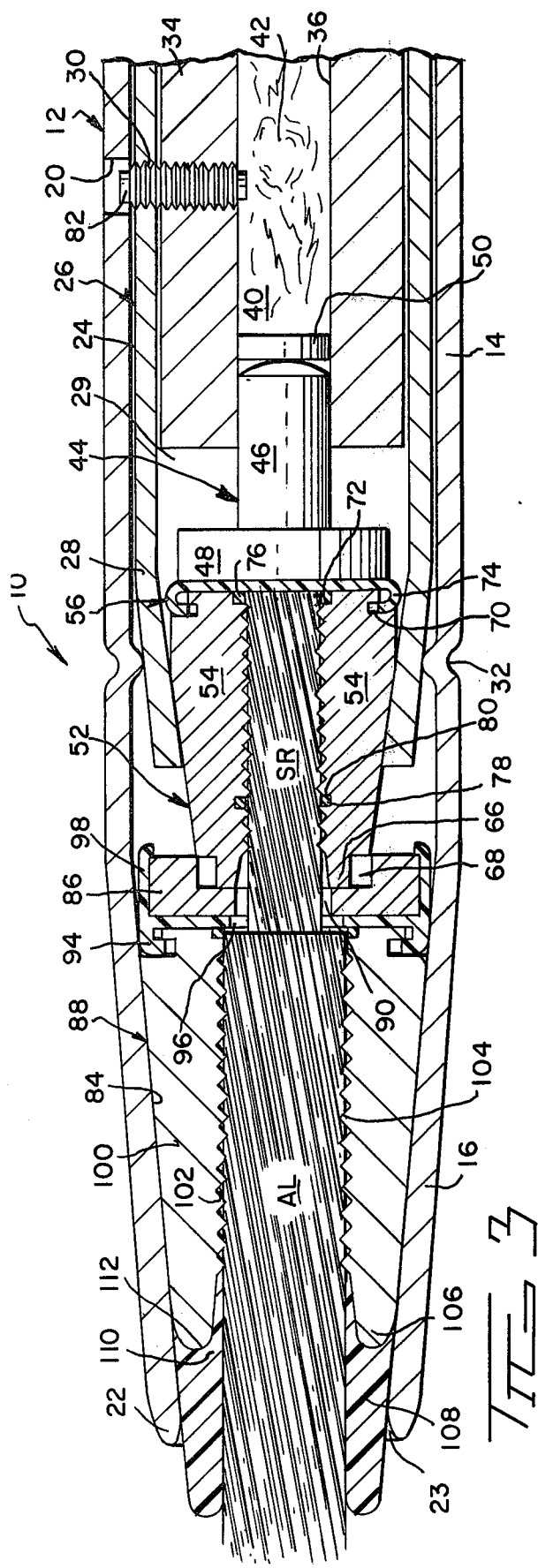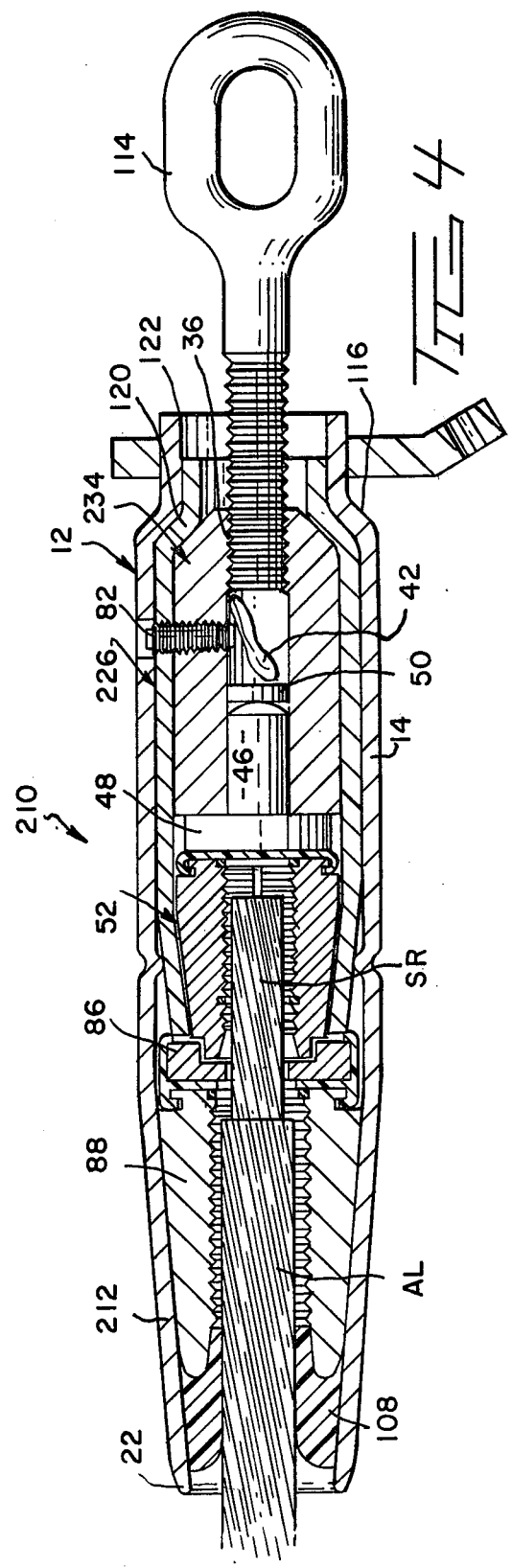

INTERNALLY FIRED SPLICING DEVICE

BACKGROUND OF THE INVENTION

1. Field of the Invention

This invention relates to devices for joining aluminum cable of the type having an inner, steel reinforcing core, by driving cable gripping jaws onto the cable by explosive means. The jaws are confined in conically shaped housings.

2. Prior Art

In U.S. Pat. No. 3,515,794, there is disclosed an electrical connector assembly for splicing or terminating aluminum cable having a steel reinforcing core, such cable being known by the initials "ACSR". In the aforementioned patent, two sets of cable gripping jaws are loaded in tandem in a conical shell. A piston is driven against the inner set of jaws which in turn drives the outer set. The patent teaches two methods of driving the jaws, one of which employs a firing chamber and a propellant.

U.S. Pat. No. 3,681,512 discloses a connector device for splicing larger diameter electrical cable by means of cable gripping jaws housed in a conical sleeve. The jaws are driven by an explosive-powered piston. One embodiment of the device incorporates two sets of jaws, one within the other, to be used with ACSR cable. In this disclosure, the set of jaws used to grip the inner core of steel wire is positioned within the jaws which grip the outer and larger diameter aluminum strands. Both sets of jaws are driven simultaneously by one piston.

SUMMARY OF THE PRESENT INVENTION

The present invention is an internally fired device having two sets of jaws arranged in tandem. One set is adpated to engage the steel inner core of the cable and the second set is adapted to engage the aluminum strands surrounding the steel core. Two separate housings, one inside the other, are required.

BRIEF DESCRIPTION OF THE DRAWINGS

FIG. 1 is a very small scale, perspective drawing showing the general outer configuration of the splicing device of the present invention;

FIG. 2 is a longitudinal cross-section of a portion of the device of FIG. 1 taken along line 2—2 of that drawing;

FIG. 3 is the same view as FIG. 2 but taken after a ACSR cable has been terminated with the device; and FIG. 4 shows a second device incorporating the features of the present invention.

DESCRIPTION OF THE INVENTION

U.S. Pat. No. 3,681,512 is incorporated herein by reference in its entirety. The present invention relates to an explosively actuated device for splicing or terminating; i.e. deadending, large diameter cable. More particularly, the present invention was invented in response to the problem of splicing or terminating extra high strength transmission cable of the ACSR type. This type cable has an ultimate tensile strength of 111,132 kilograms (approx. 245,000 lbs.). The structure of ACSR can be seen in FIGS. 2 and 3 wherein the letters "SR" denote the center core of steel reinforcing strands and the letters "AL" denote the outer aluminum strands.

The elongated internally fired splicing device 10 of the present invention as seen in FIG. 1, shows the outer housing which is formed into three sections from a piece of tubular, heat treated aluminum. The outer housing, hereinafter designated by reference numeral 12, has a center section 14 and a two, conical end section 16, one on either side of the center section. The division between the center and end sections are designated be reference numeral 18. The outer housing is formed by drawing the end sections into the conical shape. This process is known in the art and a description thereof will not be given. The shaping process must be done after the internal components of the device are assembled therein.

A lateral opening 20, extending through the wall of outer housing 12, is located in the longitudinal center or mid-section thereof. The free ends 22 of the end sections 16, preferably rounded as can be seen in FIG. 2, define the openings to passageway 23 which extends throughout the outer housing.

As observation of FIGS. 2 and 3 will confirm, the interior surfaces of the housing 12 reflect its outer configuration.

FIG. 1 also shows ACSR cables extending from the ends of device 10.

FIGS. 2 and 3 show only one end section 16 and a bit more than one half of center section 14. As one half of the device shown is identical to the other half, these abbreviated drawings allow the components to be shown in greater detail without distracting from an understanding of the invention.

With reference to FIG. 2, a description of the internal components will be given, beginning with those occupying center cavity 24 of the housing's passageway 23. This cavity is defined and delineated by center section 14.

Reference numeral 26 designates the inner housing which has a length approximately equal to the length of cavity 24. Ends 28 are swaged into a conical shape. The profile of passageway 29 which extends through housing 26 reflects its external shape.

A threaded opening 30 in the inner housing wall intersects passageway 29.

Preferably the inner housing is made from a heat treated, steel alloy such as AISI 4340 or 4140.

Inner housing 26 is positioned in cavity 24 and retained therein by indenting the walls of outer housing 12. The indents are indicated by reference numeral 32.

A barrel 34 is positioned in the center of passageway 29 of the aforementioned inner housing. The barrel is cylindrical and massive, with a centrally positioned bore 36 passing therethrough, end to end. A transverse, threaded opening 38, provided in one wall, intersects the bore. This opening is at the mid-point of the barrel.

The barrel provides a firing chamber 40 which is the center portion of bore 36 and more particularly the area of the bore surrounding opening 38. A bag of propellant 42; i.e., an explosive material such as pistol powder is shown in the firing chamber in FIG. 2.

Bore 36 further provides the cylinder in which the main drive or primary pistons 44 are positioned. Each piston (only one shown) consists of a shaft 46 and piston head 48. As shown in FIG. 2, shaft 46 is slidably positioned in the bore with head 48 outside the barrel.

A gas seal 50 is located between the free end of shaft 46 and the propellant in firing chamber 40. The seal is preferably made from a resilient material such as polyethlyene.

Barrel 34 is preferably made from heat treated steel such as AISI 4340 or 4140 as are pistons 44.

A first set of jaws, designated generally by reference numeral 52, is located within each conical end 28 of inner housing 26. Each set of jaws consists of from four to six identical segments 54, held together at one end by a disc-shaped jaw holder 56 which is seen abutting the front front face of piston head 48 in FIG. 2.

Each jaw segment has an outer surface 58 which is beveled, back to front. In cross-section, the outer surface is curved. The inner surface is serrated perpendicular to the axis to provide teeth 60. The side surfaces 62 extending between the beveled outer surface and serrated inner surface are flat.

The segments, when loaded onto jaw holder 56, cooperatively define an externally shaped cone with a parallel-walled passage 64 extending therethrough.

The front end 66 of each segment is recessed on its outer surface as indicated by reference numeral 68. Further, the inside surface adjacent the front end is beveled.

The back end of each segment has an outwardly facing groove 70 and a notch 72 adjacent the toothed inside surface.

The jaw segments are preferably made from AISI 4140 head treated steel.

Jaw holder 56, made from plastic, is shown and described in U.S. Pat. No. 3,681,512. Briefly, there are four to six, spaced ears 74 projecting forwardly from the holder's perimeter. The free edges of the ears are formed inwardly. Four to six spacer posts 76 are aligned with and spaced inwardly from the ears on the front surface. The jaw segments are hooked to the holder by the free edges of the ears being caught in grooves 70. The posts, positioned in notches 72, restrain the segments from moving inwardly.

A spreader ring 78, of deformable plastic such as ethylene, is positioned in inwardly facing grooves 80, located on the inside surface of each segment near the front end. The ring, in conjunction with holder 56, insures the proper positioning and spacing of the segments.

An ignitor 82, having exterior threads is threaded into openings 30 and 38 and extends into firing chamber 40. This ignitor carries a primer (not shown) and the means for detonating it by an electrical current. Reference is made to U.S. Pat. No. 4,128,058 in which this type of ignitor is fully disclosed.

End sections 16 of the outer housing define inner, conical-shaped cavities 84. The two main components occupying these cavities are a secondary piston head 86 and a second set of jaws, indicated generally by reference numeral 88.

The secondary piston head is a relatively thick disc having a hole 90 passing through its center and a counterbore 92 on its backside. As shown in FIGS. 2 and 3, the nose or front end 66 of jaw segments 54 fit into the counterbore.

Preferably, the secondary piston head is made from AISI 1020 cold drawn steel.

A second jaw holder 94 holds the secondary piston head and second set of jaws together. This holder, which may be made from plastic, is disc-shaped with a center hole 96 therethrough. A skirt 98 extends rearwardly from the disc's back surface with its free edge turned inwardly over the secondary piston head to hold the two components together.

The front face of the holder has the same structure and functions in the same fashion as jaw holder 56.

The second set of jaws is very similar to the first set is structure. Each segment 100 is partially circular in cross-section. The outer surface is beveled so that the four to six segments, when loaded onto the holder define an external conical shape which conforms to the conical surface of cavity 92. The four to six segments define an interior passage 102.

The inside surface of each segment is serrated to provide a plurality of teeth 104 which are perpendicular to the jaw segment's axis.

The front end 106 of each segment is preferably chamfered with the lead-in to the first tooth being a beveled surface.

The back end of each segment is identical in structural features to segments 54 and hooks onto jaw holder 94 in the same manner as segments 54 attach to holder 56.

Jaw segments 100 are preferably made from AISI heat treated aluminum.

An elongated nose cone 108 of annular shape fits into cavity 84 between the second jaw set and ends 22 of the outer housing. A short skirt 110 on the cone slides in against the jaw segment's beveled surface 112.

Nose cone 108 is preferably made from plastic such as polyethylene.

Device 10 may be assembled in several different ways. One method of assembly includes the following steps. Take a predetermined length of tubing of AISI 4340 steel alloy and swage one end into a conical end 28. Prepare a barrel 34 to the extent of drilling bore 36 therethrough. Place a gas seal 50 and piston 44 in one end of the bore. Assemble four to six jaws segments to a holder 56 and install a spreader ring 78. Slide the jaw assembly into the steel tubing's conical end with the front ends 66 of the segments extending outwardly from that end. Press the barrel into the tubing so that the piston head abutts the jaw holder-jaw set previously installed. Drill and tap openings 30 and 38. Place a bag 42 of powder into chamber 40 from the non-swaged end of the tubing, followed by a gas seal 50, a second piston 44 and a second jaw set 52. Thereafter, the second end of the tubing is swaged into a conical end 28 to complete the forming of inner housing 26.

Assemble two jaw sets 88 and attach them to two secondary piston heads 86 via holders 94. Tape each of these assemblies to either end of inner housing 26 so that the front ends of jaw segments 54 are positioned in the counterbore 92 of the secondary piston heads. Take an aluminum tubing of predetermined length and drill an opening 20 at the longitudinal center-line. Slide the assembled inner housing and the taped-on jaw sets 88 into the aluminum tubing with threaded openings 30-38 in alignment with opening 20. Secure the inner housing by indenting the outer housing around its circumference. Swage the ends of the tubing into conical ends 16. Add ignitor 82.

In operation, a portion of the aluminum strands are cut away to expose a length of the inner steel core of the ACSR cables to be spliced together. A cable so prepared is shown in FIG. 2. The prepared ends are inserted into the device as shown; i.e., the exposed steel strands pass through the passage in the second set of jaws, the holes in jaw holder 94 and secondary piston head 86 and into passage 64 in the first set of jaws. The exposed section of aluminum strands are simultaneously positioned in passage 102 of the second set of jaws. This is the condition illustrated in FIG. 2.

Upon detonating the propellant via a current to ignitor 82, pistons 44 are pushed outwardly, driving the first jaw set 52 along the inner housings conical sections. In so doing, the front ends of the jaw segments pushes against the secondary piston heads 86 so that the second jaw sets 88 are pushed down the outer housing's conical sections.

The resultant of the aforementioned action is shown in FIG. 3. As is well-known, as the jaw sets move forwardly, the conical shape passages and beveled jaw segments cooperate to drive jaw segments inwardly so that the teeth bite into the aluminum and steel strands.

Note in FIG. 3 that as jaw set 88 moved forward, it pushed on nose cone 108 so that it is partially extruded out of the outer housing's open end 22. The cone is also laterally compressed to form a tight seal between the outer housing and cable.

As noted above, the ACSR cable has a tensile strength of 111,132 kilograms (approx. 245,000 lbs.). The device of the present invention provides a retaining force of 79,380 kilograms (approx. 175,000 lbs.) for the first steel jaw set and inner housing and a force of 31,752 kilograms (approx. 70,000 lbs.) for the second aluminum jaw set and outer housing. The combined retaining force excedes the tensile strength of the cable.

FIG. 4 shows a device 210 which incorporates the present invention. Essentially, the device has one end modified to accept an eye bolt 114. As shown in the drawing, the inner housing 226, barrel 234, and the outer housing 212 have been modified relative to their counterparts in FIGS. 2 and 3; i.e., inner housing 26, barrel 34 and outer housing 12. In each ease, these components are no longer symmetrical in that one end has been terminated just beyond the mid-section; i.e., adjacent the openings to the firing chamber. The outer housing is necked down as indicated by reference number 116 to receive bolt 114. One end of the barrel is also necked down and bore 36 associated therewith is threaded to receive eye bolt 114. The eye bolt provides a seal against gases generated by igniting powder bag 42.

Inner housing 234 is also necked down as indicated by reference numeral 120. Accordingly, the barrel, inner housing and outer housing are conformable, adjacent to and at abbreviated end 122. The sets of jaws 52 and 88 present in the conical ends of the inner and outer housings are identical to those in FIGS. 2 and 3. All other features of the device are also identical to device 10 in all essential features.

The foregoing detailed description has been given for clearness of understanding only, and no unnecessary limitations should be understood therefrom, as some modifications will be obvious to those skilled in the art.

What is claimed is:

1. A device for gripping cable of the type having a steel inner core with aluminum strands wrapped therearound, comprising:
   a. an outer housing having a cylindrical section and a conical end;
   b. an inner housing having a cylindrical section and a conical end;
   c. a cylindrical barrel positioned within the cylindrical section of the inner housing, said barrel having a passage therethrough;
   d. a first piston slidably mounted in one end of the barrel's passage;
   e. a propellant positioned in the barrel's passage adjacent the piston;
   f. a first set of cable gripping, tapered jaws made from heat treated steel movably positioned in the conical end of the inner housing and in abutting relation to the piston;
   g. a second piston comprising an annular head positioned in the outer housing in front of and in abutting engagement with the first set of jaws; and
   h. a second set of cable gripping tapered jaws made from heat treated aluminum movably positioned in the conical end of the outer housing and in abutting relation to the second piston so that upon detonating the propellant the first piston drives the first set of tapered jaws down the conical end of the inner housing into gripping contact with the steel inner core which may have been positioned in the jaws the first set of jaws driving the second piston which in turn drives the second set of jaws down the conical end of the outer housing into gripping contact with the aluminum strands.

* * * * *